April 13, 1954    E. L. CAMFIELD    2,674,987
ENGINE VALVE OF TUBULAR TYPE
Filed Oct. 20, 1950    2 Sheets-Sheet 1

INVENTOR.
EMERY L. CAMFIELD
BY
Terry & Cohn
ATTORNEYS

April 13, 1954     E. L. CAMFIELD     2,674,987
ENGINE VALVE OF TUBULAR TYPE
Filed Oct. 20, 1950     2 Sheets-Sheet 2
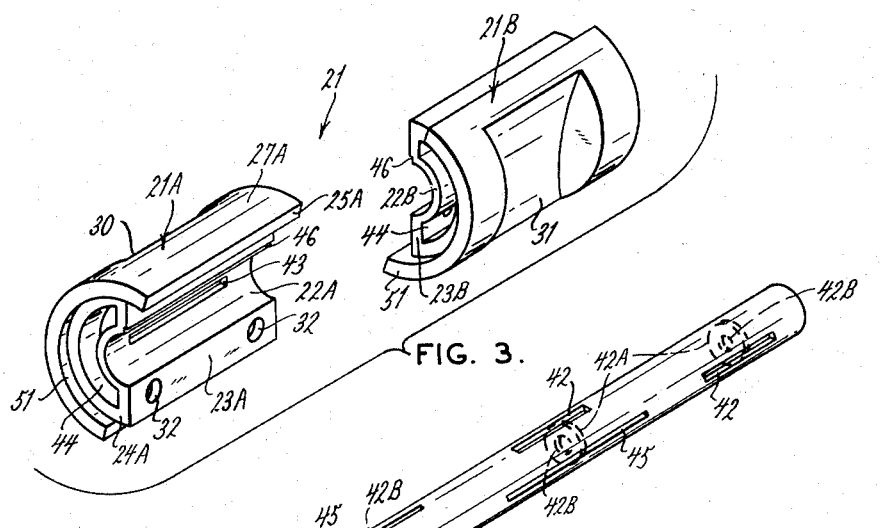
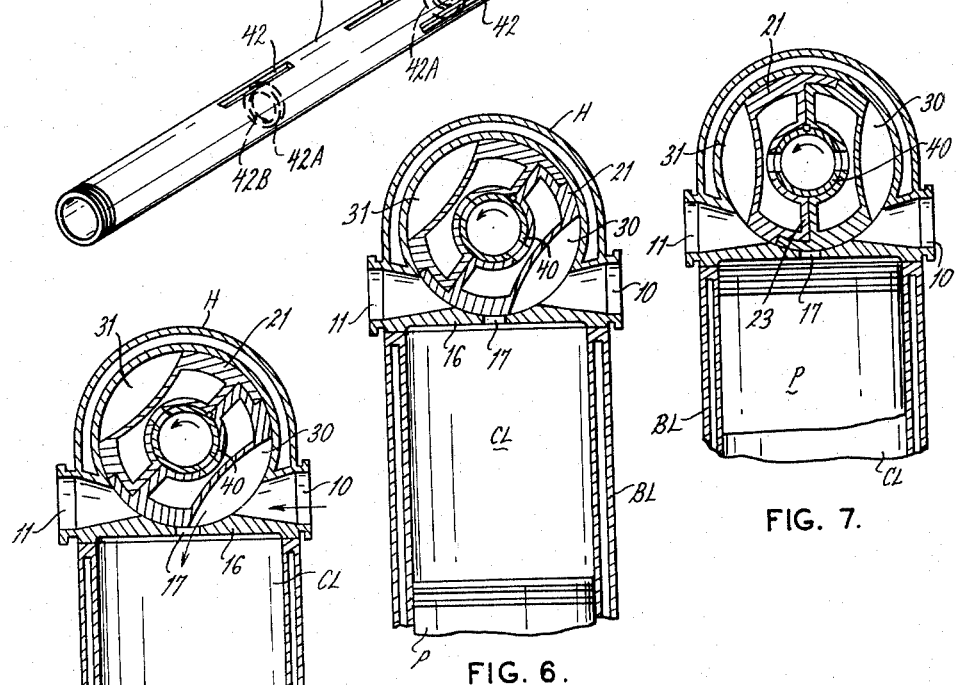
INVENTOR.
EMERY L. CAMFIELD
BY
ATTORNEYS Patented Apr. 13, 1954

2,674,987

UNITED STATES PATENT OFFICE 2,674,987

ENGINE VALVE OF TUBULAR TYPE

Emery L. Camfield, St. Louis, Mo.

Application October 20, 1950, Serial No. 191,184

8 Claims. (Cl. 123—190)

This invention relates to improvements in engine valves of tubular type, and more particularly to valves of hollow cylindrical form for fluid flow control in equipment of various types, in compressors and the like, and particularly for internal combustion engines.

This applicant is aware of many of the numerous earlier attempts toward the design of a satisfactory rotary valve structure of cylindrical type for engines and certain other machines. However, all such designs which have heretofore been seen in the course of extensive investigation by applicant, possess one or more of the shortcomings of lubrication difficulties, imperfect sealing, a tendency to burn, pit, carbonize excessively, to seize in the housing in which the valve operates, and very seriously, tend to become deformed or distorted from true cylindrical section and frequently fail to maintain a truly rectilinear axis. The foregoing listing of operative and structural shortcomings is not intended as exhaustive, but merely as illustrative of the difficulties heretofore more frequently encountered with rotary and oscillating valves. It is accordingly a principal and primary object of the present invention to realize a valve which is so designed as to minimize, and in fact fully to obviate, each and all of the aforesaid structural and operative shortcomings. Otherwise expressed, it is a prime object of the present invention to realize a hollow cylindrical valve structure of the general type noted, which will maintain through long periods of usage, its original undistorted form, and one which may expand and contract, incident to thermal changes, in such manner as to maintain throughout the length of the valve unit, a substantially truly circular section.

A further and highly important object of the invention is realized in a hollow rotary valve member, as for internal combustion engines, which is or may be air cooled, cooled by an incoming fuel mixture, and further by a liquid coolant over substantially the major part of its generally cylindrical periphery, whereby to maintain the valve under all normal operating conditions, within a range of operating temperatures such as will, in view of the improved valve construction, minimize distortion of the valve unit.

Yet an additional objective of importance realized in the present valve assembly, consists in forming the valve unit proper of two or perhaps more sections, which sections for assembly and disasembly, mate along substantially axial planes, thus rendering easily accessible all portions of the interior of the valve as for machining, assembly, service and replacement.

Still another object of the invention is realized in an improved step joint between the mating sections of an axially divided, tubular valve assembly.

In the most advanced embodiment of the improvements, the developments objectively include the use of the valve with and on a hollow valve drive-shaft, the space through which is in communication with the chamber of the hollow valve element and will serve to augment such space to provide a conduit of ample section for a flow of cooling air or fuel mixture, and to the extent desired, effect the preheating of such air for combustion purposes in the associated engine.

The foregoing and numerous other objectives will more clearly appear from the following detailed description of a presently preferred embodiment, particularly when considered in connection with the accompanying drawing, in which:

Fig. 3 is an exploded view in perspective, showing the relation between two separated sections of a single valve unit apart from valve drive-shaft and valve housing;

Figure 2:
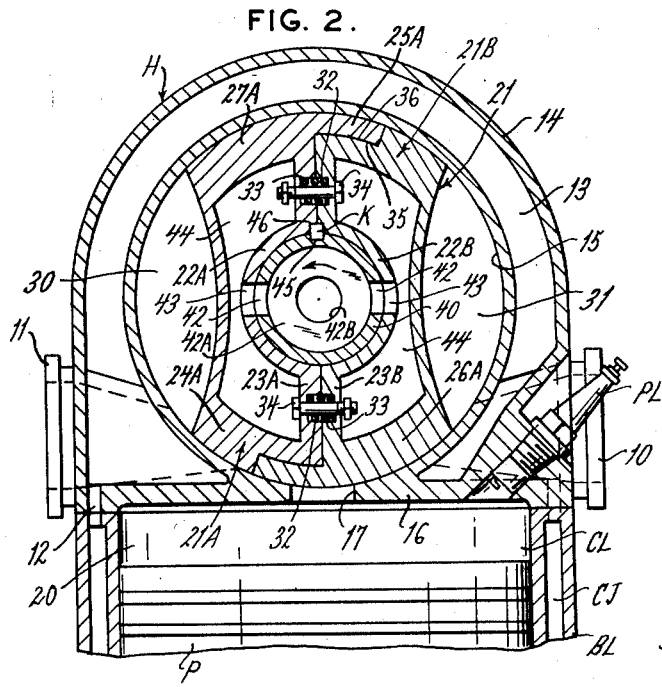
Fig. 2 is an enlarged vertical sectional view through an engine head and valve, valve housing and related parts including an upper portion of the cylinder.
Figure 8:
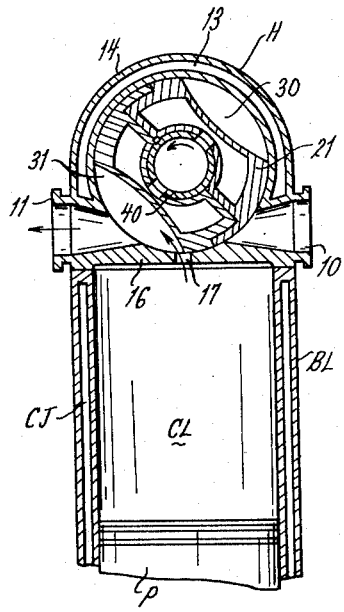

Fig. 4 is an elevational view in perspective of a valve drive-shaft suitable for use in a multi-cylinder engine, and for operative association with a plurality of the improved valve units, and Figs. 5, 6, 7 and 8 are, respectively, fragmentary vertical sectional views somewhat reduced in scale in comparison with Fig. 2, and partly diagrammatic, showing four successive positions of the valve unit during normal cyclic operation of the engine.

Figure 1:
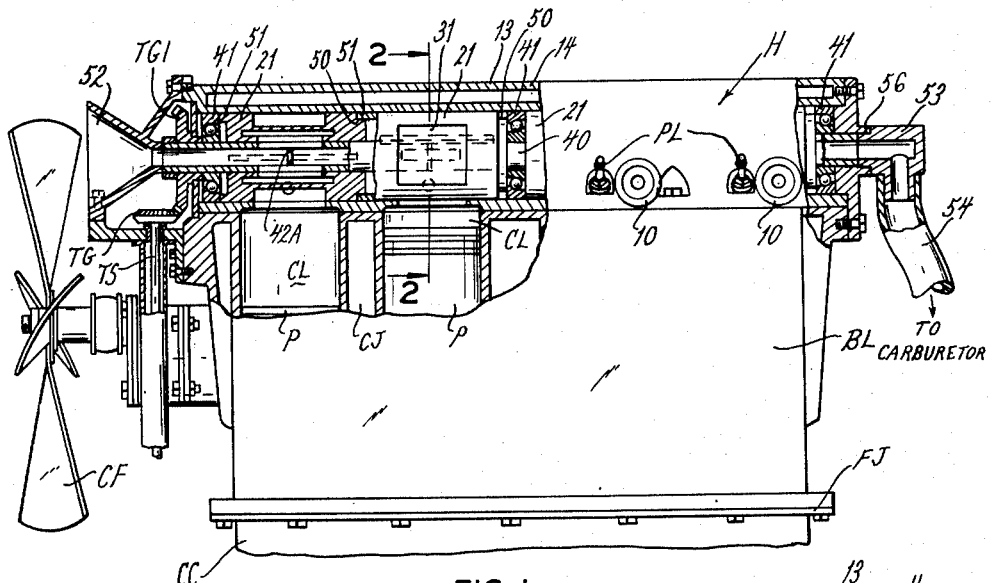
Fig. 1 is a side elevational view of an internal combustion engine showing only the portions thereof material to the present disclosure, and with certain portions broken away and others shown in vertical section to reveal interior structure.

Referring now by characters of reference to the drawing, and first to Fig. 1, the engine block, one side of which, including a portion of a lateral closure, is indicated at BL, there being attached as through a flange joint FJ, a portion of a crank case enclosure element indicated at CC. A four cylinder engine is shown, although it will be understood that the improvements are applicable to either a single or a multicylinder engine characterized by any reasonable or practicable number and arrangement of cylinders. Although a vertical engine is shown, the improvements are equally applicable to those of V type or to those of horizontal or other arrangement of cylinder or cylinders. Usual operating accessories are omitted in the interest of clearness of illustration, such as a carburetor, magneto or other ignition and fuel supply devices, fuel pump, coolant circulation provisions, and others all of which will be obvious to those skilled in the art.

The block BL is surmounted by a head H serving to close except for fuel and exhaust ports, the upper ends of the several cylinders CL. A vertical timing shaft TS may be considered as a rotary member suitably journalled and provided at its upper end with a timing gear TG, enmeshing in bevel gear relation, a gear TGI. A cooling fan CF, is included for completeness in Fig. 1, and by way of exemplifying usual ignition equipment, plugs PL are shown, one per cylinder.

The elements as thus far described, are or may be of a substantially conventional character, and largely matters of choice in the embodiment of the present improvements, with the exception of features of the head structure H. In the head, provision is made, as through the usual manifolds (not shown) for connection to each of the cylinders as through an intake fitting 10 and an exhaust fitting 11, both shown as of flanged type. Each of the cylinders CL is shown as provided with a jacket CJ for a liquid coolant, and a circulation thereof through a usual pump or the like (not shown) and from the jacket CJ through a thimble connection 12 into a part-cylindrical water jacket generally indicated at 13. This latter is defined by an outer wall 14 and an inner wall 15, the latter of which is suitably internally finished to provide a precision cylindrical bore in which operates for valving action, the valve units proper, later to be described. The head structure further includes an outer cylinder wall 16 provided with an elongate cylinder port 17 directed substantially medially of the clearance 20 into the cylinder CL, above the piston P. As will appear, the passages provided by the intake and exhaust fittings 10 and 11 respectively, are directed into the bore 15 along lines which, produced, bear a chordwise or tangential relation to the bore 15 and a similar relation to the valve element generally indicated at 21.

Proceeding now to describe the valve elements, as embodying the major features of present novelty, while each of these is shown as assembled of a pair of substantially semi-cylindrical sections, it is possible to embody many of the features thereof in an integral or one piece unit. Whether a sectional or one-piece construction be preferred, it may be described by reference to the present drawing in which each valve unit, there being preferably one such unit per cylinder, includes a cylindrical hub portion 22A—22B. Projecting outwardly and radially of the hub 22A—22B, is a diametral strut portion shown as comprised of portions 23A and 23B, these being in the form of planar web or spider members, each extended substantially the full length of the individual valve unit, and each of which constitutes a bridge between the hub and the shell or outer peripheral portion of the valve. The various shell portions are indicated in Fig. 2 at 24A, 25A, 26A and 27A. In the end portions of the valve unit, the shell thereof is fully cylindrical as will best appear from Fig. 3, but between such cylindrical portions and on opposite sides of each valve are formed partly cylindrical recesses or valve pockets 30 and 31, the form of which best appears at 31 in Fig. 3, but which pockets, in coaction with the passages in members 10 and 11, serve periodically to establish communication between these passages, one at a time, and the clearance or combustion space CL, as will later appear.

A distinct advantage of the particular construction of valve as described, lies in the fact that, as the valve unit is subject to contraction and expansion due to thermal changes, the expansion of the hub which is of a distinctly minor order, will of course occur circularly while the expansion of the struts 23A—23B, will occur radially, and the effect of such expansion will be communicated substantially centrally of the periphery or shell of the valve, and in zones intermediate the two valve pockets. Experiments have shown that the arrangement illustrated will result in a substantially circular expansion of the shell upon increase in temperature, and that irrespective of such expansion (or of opposite contraction) the arrangement will serve at all times to preserve a truly circular sectional aspect of the valve in all regions between its ends, except of course as a true circular conformity is necessarily interrupted in the regions of the valve pockets 30—31.

The preferred construction for manufacturing economies as well as for control of expansion along the lines above noted, is to form the valve unit 21 of the two axially separable sections indicated at 21A and 21B (Fig. 3). According to this construction, the hub portion of the valve consists of two mating semi-cylindrical portions, the parting plane between which intersects the axis of the unit. In the sectional construction the bridge, spider or strut is composed of paired elements in this region such as 23A and 23B; these latter are provided in diametrally related zones with counterbores resulting in assembly in spring pockets 32, each containing a compression spring 33 with the two sections held in assembly as by a bolt and nut assembly 34 extending through each chamber 32 and the spring therein. In the sectional arrangement the strut pieces of each section are slightly dissimilar on opposite sides of the axis, one such piece of each section extending outwardly as shown to merge into one element of a step joint characterized by arcuate mating surfaces 35 and 36. With the parts thus assembled, the arcuate surfaces 35—36 which may if desired, be lapped, are free to work upon each other and their relatively reverse relation in the opposite zones of the valve, result in a substantially Z shape joint. Such a step joint and sealing arrangement is of particular advantage in that it enables an expanding separation of the two halves or sections of the valve unit, under the outward thrust of each of the springs 33 so that the latter serve to keep the valve unit in sealing relation within the bore 15 at all times. Optionally, depending upon coefficient of the valve metal, the springs 33 may be tension units anchored at each end of the spring pocket, and thus oppose expansion of the parts of the valve proper.

It is a distinct preference that each of the valve units, be of uniform diameter rather than of tapered construction.

It will have appeared that there is a substantial spacing between the hub portion in each valve and the shell thereof, and a lesser yet appreciable spacing between the hub and the inturned curved bottom walls of the valve pockets 30 and 31 as will appear from Fig. 2. This substantial chamber or partial conduit within each valve 21 serves to carry a flow of air, and by further preference, the valves are mounted for rotative support within the bore 15 of the head or valve housing, on a hollow valve drive-shaft 40, the interior of which is substantially smooth and uninterrupted. The valve drive-shaft 40 as seen in Fig. 1, is rotated through the gear TGI and journalled in suitable anti-friction bearings 41, the valve drive-shaft being provided with a series of elongate air ports 42 which in assembly are in registry with air ports 43 through which ports 42—43 there is established free communication between the chamber 44 of each valve unit and the interior of the valve drive-shaft. In the valve drive-shaft 40 is provided a suitable keyway 45 and a companion keyway 46 in one of the struts, through which a key K keeps the valve unit in fixed and timed yet easily detachable relation to the valve drive-shaft 40.

Fig. 4 illustrates a hollow valve drive-shaft substantially as same will appear prior to assembly of the line of valves 21 thereto, it being noted that the tubular shaft is characterized by both the keyway 45 and an air port 42 for each cylinder served by the valve drive-shaft, and that in some specific arrangement or pattern depending upon firing order, the air ports and key slots will appear in both an angularly and axially staggered relation along the shaft. Air circulation into and out of each valve unit is promoted by a transverse shaft partition 42A intermediate each air port 42. In a series of the partitions 42A, graduated center openings 42B may be provided, to control the degree of air diversion by the several partitions.

In order to assure alignment of the several valve units, the end portions of each are formed (Fig. 1) to provide an undercut shoulder 50 and overlying portion of the end of the adjacent valve indicated at 51. Thus the adjacent valve ends bear an interfitting relation, acting to seal as well as to align the mating ends of the section. At one or the outer, say the forward end of the engine, there is provided an air mouth or bell 52 which will augment the air pickup directed into the interior of valve drive-shaft 40 and which will also circulate, by reason of the ports 42 and 43, through the aligned open-end chambers 44 of the assembly of valves, the air stream being conducted at the rear or inner end of the engine into a fitting 53 which may be connected as through a flexible tubing element 54 to the air intake of the carburetor or otherwise used to supply a warmed stream of combustion air to the engine. A running seal indicated at 56, is provided between the end of the rotatable shaft 40 and the fitting 53 as will appear from Fig. 1.

While many of the functional advantages of the structure described have been touched upon previously, it may be noted for completeness that the present disclosure is directed by way of example but without limitation, to a four cycle internal combustion engine. It may further be noted that although the terms "rotary" and "rotary valve" and the like have been used herein, such terminology is intended in reference to a class or type of valve, rather than to exclude the possibility of actuation of the present structure in a rockable or oscillatory valve assembly.

Four cycle operation being assumed, it will be seen from a comparison of the diagrams of Figs. 5, 6, 7 and 8, that near the beginning of the intake stroke of piston P, the valve pocket 30 will establish communication between the intake passage 10 and the cylinder port 17. The port 17 is by preference of a length at least equal to the axial length of each of the pockets 30 and 31 in the valve. In about the position shown by Fig. 5, the downward movement of piston P will induct a charge of mixture through passage 10 and port 17, continuing substantially through this portion of the cycle. The movement of the valve 21 being counterclockwise in the diagrams of Figs. 5-8 as indicated by the arrows therein, upon the beginning of the compression stroke of the piston the trailing edge of pocket 30 will have just closed the clearance port 17. This port is of course kept closed throughout the compression stroke and through the ensuing firing and working stroke of the piston, a preferred substantial firing position of the valve 21 being shown by Fig. 7. It is a distinct preference as to the construction and the timing of the valve 21 that at about the time of firing, hence the peak cylinder pressures, the struts 23A—23B, lie in or near a plane which will include an extension of the cylinder axis; thus this arrangement assures that the peak pressures impressed upon the valve through the port 17, are directly received and best resisted by subjection of the struts to substantially endwise stresses. From this it results that the loading upon the struts 23 is directly imparted to the hub portion of the valve and thence to the valve drive-shaft and journals to the relatively rigid head structure H.

As the valve 21 proceeds in its rotation counterclockwise as shown, to a point such that the leading edge of valve pocket 31 starts to uncover the clearance port 17, exhaust may now occur outwardly through the clearance port and into the exhaust passage 11.

It will have appeared as an advantage in the cooling of the valve as well as in the preheating of the incoming mixture, that each of the valve pockets, such as 30 or 31, will alternately serve the intake passage and the exhaust passage, and that having been inevitably heated to a certain extent by the outflowing gases, the thus-heated pocket will soon be cooled by the intake flow of fresh mixture with the effect of preheating such inflow to a substantial extent over and above the preheating effect of the combustion air, as above, described.

It will of course be understood that the angular extent of the pockets 30—31 as well as the depth and other specific dimensions thereof in a given engine, may be varied in accordance with the characteristics, such for example as the stroke, of the particular engine in a manner which will now have become apparent to those skilled in the art.

With further reference to the valve cooling and air and mixture preheating facilities of the present valve structure, it has been heretofore noted that but for the space occupied by the metal of the valve hub, the section of metal in the valve drive-shaft 40, and that in the struts 23, the entire space within the hollow valve unit is available for movement of air, or mixture if desired, endwise therethrough. Thus the valve is kept within a fully safe range of operating temperatures due to the substantial air cooling stream noted; further, each valve unit is substantially cooled by passage through its valve pockets of the incoming mixture and is almost fully peripherally cooled by the liquid coolant in the jacket space 13. A still further cooling advantage should however be noted: Since the air is initially and primarily introduced, in the structure shown, through the bell 52 thence directly to the interior of shaft 40, a distinct advantage is felt to exist in the location of the paired ports 42 and 43 such that these ports deliver air from the valve drive-shaft directly against the intermediate portions of the bottom walls of the valve pockets 30 and 31, as will appear from Fig. 2. While these ports are of substantial length, their relatively minimized width results in what may be regarded as a cooling jet of air, projected centrally of the bottom of each valve pocket and opening close to the innermost parts of the valve pocket walls.

The present disclosure includes no reference to a specific lubrication system, but it may be noted as contemplated to supply the assembly of valve units 21 at spaced points along the length of assembly and into the head structure H, with lubricating oil under pressure, which may be supplied by conventional means such as the usual oil pump of the engine.

It will have appeared that the valve assembly of the present design serves fully to realize each of the several objectives above expressed, and others implied in and from the more detailed description.

Although the invention has been described by making detailed reference to a single preferred embodiment, the description should be understood solely in an illustrative, rather than in any limiting sense, numerous variants being possible within the fair scope of the claims hereunto appended.

I claim as my invention:

1. In a rotary tubular valve adapted for use in a cylindrical valve housing of an internal combustion engine, the valve comprised of a hub, a shell arranged concentric with said hub, and a spider connecting said hub and said shell, each of said elements being divided diametrally of the valve, the shell being provided with an arcuate step joint as a continuation of the spider in each of a pair of diametrally opposed regions, the step joints being located in relatively reversed positions, and a compression spring member on each opposite side of the hub coacting with said spider to expand the valve sections.

2. In a hollow cylindrical rotary-type valve adapted for use in and with a cylindrical valve receiving bore in an engine, a sectional tubular body forming the valve member and provided with peripheral valve pockets, said member being diametrally divided in a plane along the longitudinal axis of the valve element in such manner that the outer portion or shell of the valve body may freely expand along generally circular lines, said shell sections being peripherally overlapping on mutually engaging, part cylindrical seats disposed in relatively reverse positions at diametrally opposed shell regions, and spring means internally of the valve tending to expand same within a bore in which the valve element operates.

3. A rotary valve for use within a fixed internally cylindrical valve housing structure in an engine or the like, the valve comprised of two sections arranged for parting and assembly substantially along a diametral plane, each said section comprising substantially a half hub, a half diametral spider and a substantially semicylindrical peripheral portion, said sections and assembly being formed to provide an arcuate step joint at diametrally opposed peripheral portions, the step joints being disposed in relatively reversed positions, adjacent spider portions being provided with bores on opposite sides of the hub, and a spring element disposed in each bore and coacting with said spiders to expand the two sections.

4. The combination and arrangement of elements as recited by claim 3, but further characterized in that each of said valve members in assembly presents at one end a circular joint structure of reduced diameter and at the opposite end a mating joint portion so formed as to overlie said reduced portion, with a plurality of said members axially assembled in endwise interfitted relation.

5. A rotary valve for use in an internal combustion engine having a valve housing structure formed to provide an internal cylindrical bore of even diameter from end to end, said rotary valve comprised of a cylindrical shell recessed in each of a pair of opposite peripheral regions to form valve pockets, each of said pockets being in the form of a segment of a cylinder, the valve further including a hollow cylindrical hub portion, part cylindrical periphery or shell portion arranged concentric with said hub portion, and a pair of opposite, aligned radial struts connecting the hub portion and the peripheral portion, the struts being the sole means of connection between the hub and the outer periphery or shell of the valve, the valve having the shell, the struts and the hub portion thereof formed in two axially separable mating sections, the sections formed to provide an arcuate step joint in each of a pair of diametrally related cylindrical peripheral regions, the step joints being disposed in relatively reversed relation, said strut portions being provided with spring receiving bores on opposite sides of the hub portion, and a compression spring in each of said bores together with an assembly screw element extending through each bore, spring and the adjacent portions of the struts, said springs coacting with the struts in tending to expand the sections against the cylindrical bore in which the valve operates.

6. In a rotary tubular valve adapted for use in a cylindrical valve housing of an internal combustion engine, the valve comprised of adjacent sections arranged for parting and assembly, each said section comprising a hub portion, a spider element connected to the hub portion, and a shell portion connected to said spider element and arranged concentric with said hub portion, each of said shell portions being provided with a pair of arcuate seats, the seats of each shell portion peripherally overlapping and mutually engaging the seats of an adjacent shell portion, and spring means internally of the valve tending to expand the valve sections.

7. In a rotary tubular valve adapted for use in a cylindrical valve housing of an internal combustion engine, the valve comprised of a hub, a shell arranged concentric with said hub, and a spider connecting said hub and said shell, each of said elements being divided diametrally of the valve, the shell being provided with an arcuate step joint in each of a pair of diametrally opposed regions, the step joints being located in relatively reversed positions, and a spring means internally of the valve tending to expand the valve sections.

8. In a hollow cylindrical rotary-type valve adapted for use in and with a cylindrical valve receiving bore in an engine, a sectional tubular body forming the valve member, said member being diametrally divided in a plane along the longitudinal axis of the valve member, the outer portion of the valve member constituting a shell, said shell sections being peripherally overlapping on mutually engaging, part cylindrical seats disposed in relatively reversed positions at diametrally opposed shell regions, and spring means internally of the valve member tending to expand said valve member.

References Cited in the file of this patent

UNITED STATES PATENTS

| Number | Name | Date |
|---|---|---|
| 1,119,494 | Bournonville | Dec. 1, 1914 |
| 1,259,063 | Winkle | Mar. 12, 1918 |
| 1,361,397 | Moorhead | Dec. 7, 1920 |
| 1,380,742 | Sallee | June 7, 1921 |
| 1,519,205 | Kiefer | Dec. 16, 1924 |
| 1,644,907 | Zahodiakin | Oct. 11, 1927 |
| 1,697,098 | Wehr | Jan. 1, 1929 |
| 1,731,015 | Lehman | Oct. 8, 1929 |
| 1,731,016 | Lehman | Oct. 8, 1929 |
| 1,924,188 | Hall | Aug. 29, 1933 |
| 2,146,528 | Chilton | Feb. 7, 1939 |
| 2,346,052 | Seamark | Apr. 4, 1944 |

FOREIGN PATENTS

| Number | Country | Date |
|---|---|---|
| 262,606 | Italy | 1929 |
| 504,709 | Great Britain | Apr. 28, 1939 |